(12) United States Patent
Masuda (10) Patent No.: US 11,209,009 B2
(45) Date of Patent: Dec. 28, 2021

(54) ROTATING MACHINE

(71) Applicant: MITSUBISHI HEAVY INDUSTRIES COMPRESSOR CORPORATION, Tokyo (JP)

(72) Inventor: Yuji Masuda, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 72 days.

(21) Appl. No.: 16/344,270

(22) PCT Filed: Feb. 2, 2017

(86) PCT No.: PCT/JP2017/003777
§ 371 (c)(1),
(2) Date: Apr. 23, 2019

(87) PCT Pub. No.: WO2018/142535
PCT Pub. Date: Aug. 9, 2018

(65) Prior Publication Data
US 2019/0271325 A1 Sep. 5, 2019

(51) Int. Cl.
*F04D 29/10* (2006.01)
*F04D 17/10* (2006.01)
(Continued)

(52) U.S. Cl.
CPC ........... *F04D 29/102* (2013.01); *F04D 17/10* (2013.01); *F04D 17/122* (2013.01);
(Continued)

(58) Field of Classification Search
CPC ...... F04D 29/10; F04D 29/102; F04D 29/104; F04D 29/12; F04D 29/122; F04D 29/124;
(Continued)

(56) References Cited

U.S. PATENT DOCUMENTS 2,679,412 A * 5/1954 Whitfield .............. F04D 29/122
277/364
3,971,563 A * 7/1976 Sugimura .............. F16J 15/162
277/413
(Continued)

FOREIGN PATENT DOCUMENTS

EP 1207310 A1 5/2002
EP 1281871 A1 * 2/2003 ........... F04D 29/584
(Continued)

OTHER PUBLICATIONS

International Search Report issued in corresponding International Patent Application No. PCT/JP2017/003777, dated Mar. 28, 2017 (2 pages).
(Continued)

*Primary Examiner* — David E Sosnowski
*Assistant Examiner* — Wayne A Lambert
(74) *Attorney, Agent, or Firm* — Osha Bergman Watanabe & Burton LLP (57) ABSTRACT

A rotating machine includes: a rotary shaft that is configured to rotate about a center axis; an impeller that is fixed to the rotary shaft and that is configured to compress a working fluid by integrally rotating with the rotary shaft; a casing that covers the rotary shaft; a first seal portion that is disposed at a position away from the impeller in a center axis direction of the rotary shaft and that is configured to seal a portion between the rotary shaft and the casing with a seal gas; a second seal portion that is disposed between the impeller and the first seal portion and that is configured to seal a portion between the rotary shaft and the casing; and a gas supply path through which the seal gas is introduced into the first seal portion.

4 Claims, 6 Drawing Sheets

(51) Int. Cl.

| | | |
|---|---|---|
| *F04D 29/041* | (2006.01) | |
| *F04D 17/12* | (2006.01) | |
| *F16J 15/40* | (2006.01) | |
| *F16J 15/447* | (2006.01) | |
| *F04D 29/12* | (2006.01) | |
| *F04D 29/051* | (2006.01) | |

(52) U.S. Cl.
CPC ......... *F04D 29/041* (2013.01); *F04D 29/124* (2013.01); *F16J 15/40* (2013.01); *F16J 15/4472* (2013.01); *F04D 29/0513* (2013.01)

(58) Field of Classification Search
CPC .... F04D 29/041; F04D 29/0513; F04D 17/10; F04D 17/122; F16J 15/40; F16J 15/4472
See application file for complete search history.

(56) References Cited

U.S. PATENT DOCUMENTS

| | | | | |
|---|---|---|---|---|
| 4,257,617 A | * | 3/1981 | Hill | F16J 15/008 277/303 |
| 4,523,896 A | * | 6/1985 | Lhenry | F04D 29/058 310/90.5 |
| 4,725,196 A | * | 2/1988 | Kaneki | F04D 29/104 415/100 |
| 4,993,917 A | * | 2/1991 | Kulle | F04D 29/0516 415/105 |
| 5,412,977 A | * | 5/1995 | Schmohl | F16J 15/3404 73/46 |
| 5,454,689 A | * | 10/1995 | Falavigna | F01D 11/04 277/303 |
| 5,577,885 A | * | 11/1996 | Urlichs | F01D 11/00 415/105 |
| 5,718,560 A | * | 2/1998 | Lorenzen | F16J 15/3404 415/47 |
| 5,795,138 A | * | 8/1998 | Gozdawa | F04D 17/12 417/243 |
| 6,070,881 A | * | 6/2000 | Longree | F16J 15/40 277/409 |
| 6,398,484 B1 | * | 6/2002 | Orikasa | F04D 17/122 415/112 |
| 6,524,059 B1 | * | 2/2003 | Nogiwa | F01D 11/04 415/112 |
| 6,802,689 B2 | * | 10/2004 | Nogiwa | F04D 27/0292 415/26 |
| 8,061,984 B2 | | 11/2011 | Kuzdzal et al. | |
| 8,632,320 B2 | * | 1/2014 | Palomba | F04D 29/286 417/247 |
| 9,206,819 B2 | * | 12/2015 | Maier | F04D 29/00 |
| 9,239,061 B2 | * | 1/2016 | Kitano | F16J 15/406 |
| 9,243,645 B2 | * | 1/2016 | Shinohara | F04D 29/0513 |
| 2007/0147988 A1 | * | 6/2007 | Ito | F04D 29/124 415/169.1 |
| 2013/0259679 A1 | * | 10/2013 | Brailean | F04D 29/122 415/230 |

FOREIGN PATENT DOCUMENTS

| | | | | |
|---|---|---|---|---|
| EP | 2917589 B1 | | 1/2017 | |
| JP | S6224077 U | | 2/1987 | |
| JP | H02245496 A | | 10/1990 | |
| JP | H06174106 A | | 6/1994 | |
| WO | WO-2010102940 A1 | * | 9/2010 | ........... F16J 15/3484 |
| WO | WO-2016080014 A1 | * | 5/2016 | ........... F16J 15/3492 |
| WO | WO-2016117188 A1 | * | 7/2016 | ............... F16J 15/34 |
| WO | WO-2016174706 A1 | * | 11/2016 | ............... F25J 1/0268 |

OTHER PUBLICATIONS

Written Opinion issued in corresponding International Patent Application No. PCT/JP2017/003777, dated Mar. 28, 2017 (9 pages).

\* cited by examiner

ROTATING MACHINE

TECHNICAL FIELD

The invention relates to a rotating machine.

BACKGROUND ART

In general, a centrifugal compressor includes an impeller provided in a rotary shaft and a casing that forms a flow path between the impeller and the casing by covering the impeller from an outer side. Such a centrifugal compressor compresses a fluid supplied from the outside via the flow path formed in the casing by the rotation of the impeller.

Here, the impeller includes an impeller flow path that continues from a radially inner side to a radially outer side. The impeller flow path has an inflow port, which is on the radially inner side and opens in a rotary shaft direction, and an outflow port, which is on the radially outer side and opens to the radially outer side. The impeller absorbs a fluid from the inflow port on the radially inner side into the impeller flow path and compresses the fluid while allowing the fluid to flow out from the outflow port on the radially outer side.

For example, as disclosed in Patent Document 1, a thrust force in a center axis direction of the rotary shaft is generated with respect to the impeller due to the pressure of the fluid. Specifically, the pressure of the fluid before compressing acts on a radially inner side region of the impeller in which the inflow port is formed. In addition, in a radially outer side region of the impeller, some of the fluid that flows out from the outflow port of the impeller flow path flows into both surface sides of the impeller in the center axis direction. Accordingly, a high pressure of the fluid after compressing acts on both surfaces of the impeller in the center axis direction in the radially outer side region of the impeller.

As described above, a thrust force in a first direction and a thrust force in a second direction, which face opposite sides in the center axis direction, act on the impeller due to the pressure of the fluid acting on both surfaces of the impeller in the center axis direction. As a result of the thrust force in the first direction and the thrust force in the second direction canceling each other, a thrust force corresponding to a difference between the thrust force in the first direction and the thrust force in the second direction practically acts on the impeller and the rotary shaft. In order to support the thrust force, a thrust supporting member such as a thrust bearing is provided in a rotating machine such as a centrifugal compressor.

CITATION LIST

Patent Literature

[Patent Document 1] Japanese Unexamined Patent Application, First Publication No. H2-245496

SUMMARY OF INVENTION

Technical Problem

However, if the thrust force is strong, a load to be supported by the thrust supporting member increases, and thereby it becomes necessary to increase a sliding resistance at the time of rotation of the impeller and to make the thrust supporting member stronger. For this reason, it is desirable for the rotating machine to reduce the thrust force.

An object of the present invention is to provide a rotating machine that can reduce a thrust force.

Solution to Problem

According to a first aspect of the present invention, there is provided a rotating machine including a rotary shaft that is rotatable about a center axis, an impeller that is fixed to the rotary shaft and compresses a working fluid by integrally rotating with the rotary shaft, a casing that covers the rotary shaft, a first seal portion that is disposed at a position away from the impeller in a center axis direction of the rotary shaft and seals a portion between the rotary shaft and the casing with a seal gas, a second seal portion that is disposed between the impeller and the first seal portion and seals a portion between the rotary shaft and the casing, a gas supply path through which the seal gas is introduced into the first seal portion, and a gas outflow path that is provided in the second seal portion and communicates with a pressure space having a pressure lower than that of the seal gas to allow at least some of the seal gas to flow out from the first seal portion to the pressure space.

In such a configuration, some of the working fluid introduced in the first seal portion from the gas supply path flows into the gas outflow path of the second seal portion, which communicates with the pressure space having a pressure lower than that of the seal gas. Accordingly, some of the seal gas flows from the first seal portion to the second seal portion. As a result, a thrust force away from the impeller, which is generated in the first seal portion by the seal gas, becomes weak.

According to a second aspect of the present invention, in the rotating machine of the first aspect, the gas supply path may be connected to a working fluid flow path, in which the working fluid flows, by a supply side connecting portion and may allow the working fluid, which is the seal gas, to be introduced into the first seal portion. The gas outflow path may be connected to the working fluid flow path at a position where a pressure of the flowing working fluid is lower than that of the supply side connecting portion.

In such a configuration, the working fluid of the rotating machine, which is the seal gas, is supplied. Therefore, it is not necessary to supply a seal gas separately from the working fluid, and thus cost reduction can be achieved. In addition, the working fluid is introduced into a seal chamber through the gas supply path, and is smoothly discharged from the gas outflow path due to the differential pressure between the outflow side connecting portion and the supply side connecting portion.

According to a third aspect of the present invention, in the rotating machine of the second aspect, the impeller may include a first impeller and a second impeller that compresses the working fluid compressed by the first impeller, and the gas supply path may communicate with the working fluid flow path at a position where the working fluid compressed by the first impeller flows.

In such a configuration, the working fluid compressed by the first impeller can be introduced into the first seal portion through the gas supply path. Accordingly, it is not necessary to increase the pressure of the seal gas introduced in the first seal portion through the gas supply path, and the effective use of energy can be achieved.

According to a fourth aspect of the present invention, in the rotating machine of the third aspect, the gas outflow path may communicate with the working fluid flow path at a position where the working fluid to be flowed into the first impeller flows.

In such a configuration, the working fluid discharged from the gas outflow path is discharged to an intake side of the first impeller. Accordingly, the working fluid that has flowed via the gas outflow path can be used again by the first impeller increasing a pressure thereof again.

According to a fifth aspect of the present invention, in the rotating machine of the third aspect, a cooling device that cools the working fluid discharged from the first impeller may be further included, and the gas outflow path may communicate with the working fluid flow path at a position where the working fluid cooled by the cooling device flows.

In such a configuration, when cooled by the cooling device, the pressure of the working fluid declines due to a pressure loss in the cooling device. Accordingly, a differential pressure occurs in the working fluid on an inlet side and an outlet side of the cooling device. Accordingly, a differential pressure occurs between the gas supply path into which the working fluid compressed by the first impeller is introduced and the gas outflow path that communicates with the outlet side of the cooling device on which the pressure of the working fluid has declined by flowing via the cooling device. The working fluid can be smoothly moved from the gas supply path to the gas outflow path via the first seal portion due to the differential pressure.

According to a sixth aspect of the present invention, in the rotating machine of any one of the first to fifth aspects, a differential pressure detecting unit that detects a differential pressure between the gas supply path and the gas outflow path and a flow rate regulating unit that regulates a flow rate of the working fluid in the gas supply path according to the differential pressure detected by the differential pressure detecting unit may be further included.

In such a configuration, when the flow rate of the working fluid in the gas supply path is regulated, a pressure acting on the first seal portion, that is, a thrust force, can be regulated. Accordingly, the thrust force can be appropriately regulated according to the differential pressure between the gas supply path and the gas outflow path.

Advantageous Effects of Invention

According to the present invention, a thrust force that occurs in the rotating machine can be reduced.

DESCRIPTION OF EMBODIMENTS

First Embodiment

Hereinafter, a rotating machine of the present invention will be described with reference to the drawings.

Figure 1:
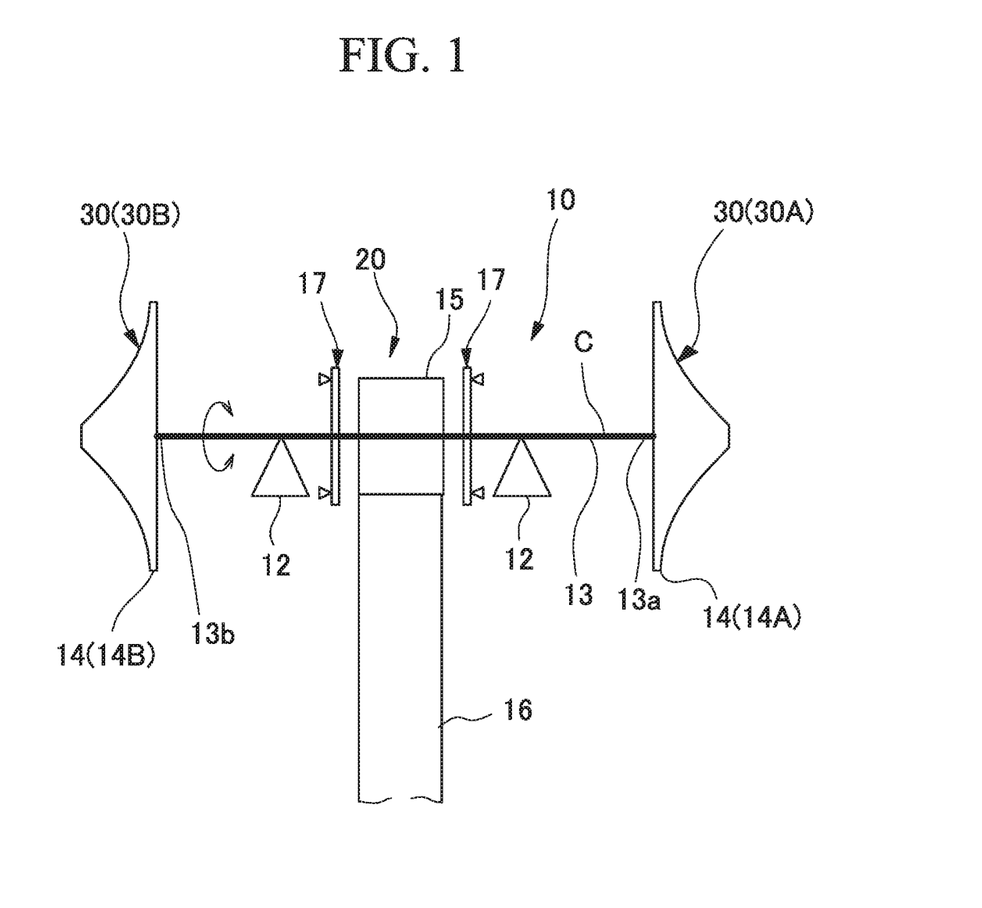
FIG. 1 is a schematic configuration view of a geared centrifugal compressor according to an embodiment of the invention.
Figure 2:
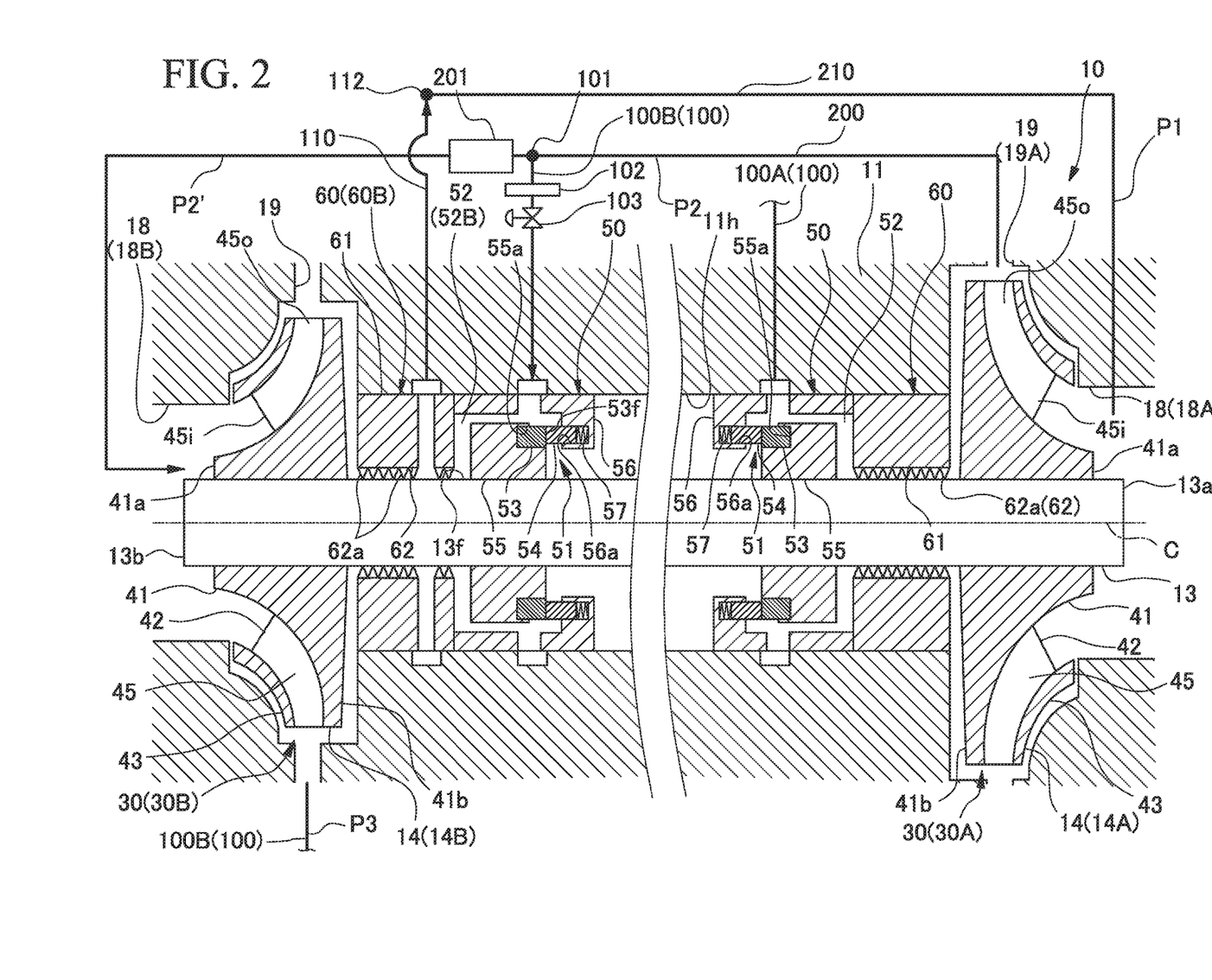
FIG. 2 is a sectional view showing a configuration of a first seal portion and a second seal portion provided in a geared centrifugal compressor according to a first embodiment of the invention.

As shown in FIGS. 1 and 2, a geared centrifugal compressor (rotating machine) 10 according to the embodiment includes a casing 11 (refer to FIG. 2), radial bearings 12 (refer to FIG. 1), a rotary shaft 13, impellers 14, a pinion gear 15, a bull gear 16, thrust bearings 17, first seal portions 50, second seal portions 60, a gas supply path 100, and a gas outflow path 110.

The casing 11 forms an outer shell of the geared centrifugal compressor 10. The casing 11 covers the radial bearings 12, the rotary shaft 13, and the impellers 14.

As show in FIG. 1, a pair of radial bearings 12 are provided in the casing 11 at a distance from each other in a center axis C direction of the rotary shaft 13. The radial bearings 12 are held by the casing 11.

The rotary shaft 13 is rotatable about a center axis C by a rotation driving force input from the outside. The rotary shaft 13 is held by the pair of radial bearings 12 so as to be rotatable about the center axis C. Both end portions 13a and 13b of the rotary shaft 13 protrude more on both sides in the center axis C direction than the pair of radial bearings 12 do.

Between the pair of radial bearings 12, the pinion gear 15 is provided on the rotary shaft 13. That is, the pinion gear 15 is disposed on an inner side of the pair of radial bearings 12 in the center axis C direction. The pinion gear 15 is meshed with the bull gear 16. The bull gear 16 is rotationally driven by an external driving source. The bull gear 16 is set to have an outer diameter dimension larger than that of the pinion gear 15. Therefore, the number of rotations of the rotary shaft 13 having the pinion gear 15 is larger than the number of rotations of the bull gear 16.

An speed-up transmission unit 20 that increases the number of rotations of the bull gear 16 caused by an external driving source via the pinion gear 15 and transmits to the rotary shaft 13 is configured by such a pinion gear 15 and such a bull gear 16.

In addition, the rotary shaft 13 includes the thrust bearings 17 at positions away from the pinion gear 15 in the center axis C direction. The thrust bearings 17 are disposed on the inner side of the pair of radial bearings 12 in the center axis C direction. The thrust bearings 17 restrict the movement of the rotary shaft 13 in the center axis C direction.

As show in FIG. 1, the impellers 14 are fixed to the rotary shaft 13 at positions away from the radial bearings 12 in the center axis C direction. The impellers 14 integrally rotate with the rotary shaft 13. The impellers 14 of the embodiment are fixed to the rotary shaft 13 on an outer side of the radial bearings 12 in the center axis C direction. Specifically, the impellers 14 are provided at the both end portions 13a and 13b of the rotary shaft 13. As shown in FIG. 2, each of the impellers 14 is a so-called closed impeller including a disk portion 41, blade portions 42, and a cover portion 43 in the embodiment.

The disk portion 41 has a disk shape. The disk portion 41 is formed as a recessed curved surface of which an outer diameter gradually increases from a first surface 41a side to a second surface 41b side of the disk portion 41 in the center axis C direction along the casing 11 in the center axis C direction. The plurality of blade portions 42 are formed in the disk portion 41 at a distance in a circumferential direction.

The cover portion 43 is formed so as to cover the plurality of blade portions 42. The cover portion 43 has a disk shape. A side of the cover portion 43 facing the disk portion 41 is formed as a projecting surface facing the disk portion 41 at a fixed distance.

An impeller flow path 45 is formed between the disk portion 41 and the cover portion 43 in each of the impellers 14. The impeller flow path 45 has an inflow port 45i that opens in the center axis C direction and an outflow port 45o that opens to a radially outer side of the impeller 14, on a radially inner side, which is the first surface 41a side of the disk portion 41.

The casing 11 includes an intake flow path 18 and a discharge flow path 19 in the vicinity of each of the impellers 14. The intake flow path 18 allows the outside of the casing 11 and the inflow port 45i of the impeller flow path 45 that opens to the radially inner side of the impeller 14 to communicate with each other. The discharge flow path 19 is formed on the radially outer side of the outflow port 45o of the impeller flow path 45. The discharge flow path 19 has a continuous spiral shape around the center axis C.

A working fluid (for example, air) is absorbed from the intake flow path 18 to the impeller flow path 45 via the inflow port 45i by the impeller 14 integrally rotating with the rotary shaft 13. The working fluid is compressed while flowing from the inflow port 45i to the outflow port 45o of the impeller flow path 45. The compressed working fluid flows out from the outflow port 45o to the radially outer side, and is introduced into the discharge flow path 19 on the radially outer side. The working fluid is further compressed while rotating about the center axis C along the discharge flow path 19.

A centrifugal compressing unit 30 is configured of such an impeller 14, such an intake flow path 18, and such a discharge flow path 19. Accordingly, as shown in FIG. 1, the geared centrifugal compressor 10 includes a pair of centrifugal compressing units 30 disposed on both sides between which the speed-up transmission unit 20 is interposed. The pair of centrifugal compressing units 30 include a first-stage centrifugal compressing unit 30A disposed on a first side with the speed-up transmission unit 20 interposed therebetween and a second-stage centrifugal compressing unit 30B disposed on a second side with the speed-up transmission unit 20 interposed therebetween. That is, the geared centrifugal compressor 10 is configured as a single-axis and two-stage compressor.

In such a geared centrifugal compressor 10, a working fluid compressed by a first impeller 14A of the first-stage centrifugal compressing unit 30A subsequently flows into the second-stage centrifugal compressing unit 30B. In the process of flowing in a second impeller 14B of the second-stage centrifugal compressing unit 30B, the working fluid is further compressed, thereby becoming a high-pressure working fluid. Therefore, the geared centrifugal compressor 10 of the embodiment has two impellers 14, including the first impeller 14A and the second impeller 14B that compresses a working fluid compressed by the first impeller 14A.

As shown in FIG. 2, the first seal portion 50 and the second seal portion 60 are provided between each of the centrifugal compressing units 30 and the speed-up transmission unit 20 (refer to FIG. 1) in the casing 11. Specifically, the first seal portion 50 and the second seal portion 60 are disposed between the impeller 14 and the radial bearing 12.

The first seal portion 50 is disposed at a position away from the impeller 14 in the center axis C direction of the rotary shaft 13. The first seal portion 50 of the embodiment is disposed on a pinion gear 15 side of the impeller 14 in the center axis C direction. The first seal portion 50 is a dry gas seal that seals a portion between the rotary shaft 13 and the casing 11 with a seal gas. The first seal portion 50 includes a seal portion 51 and a seal chamber 52.

Figure 3:
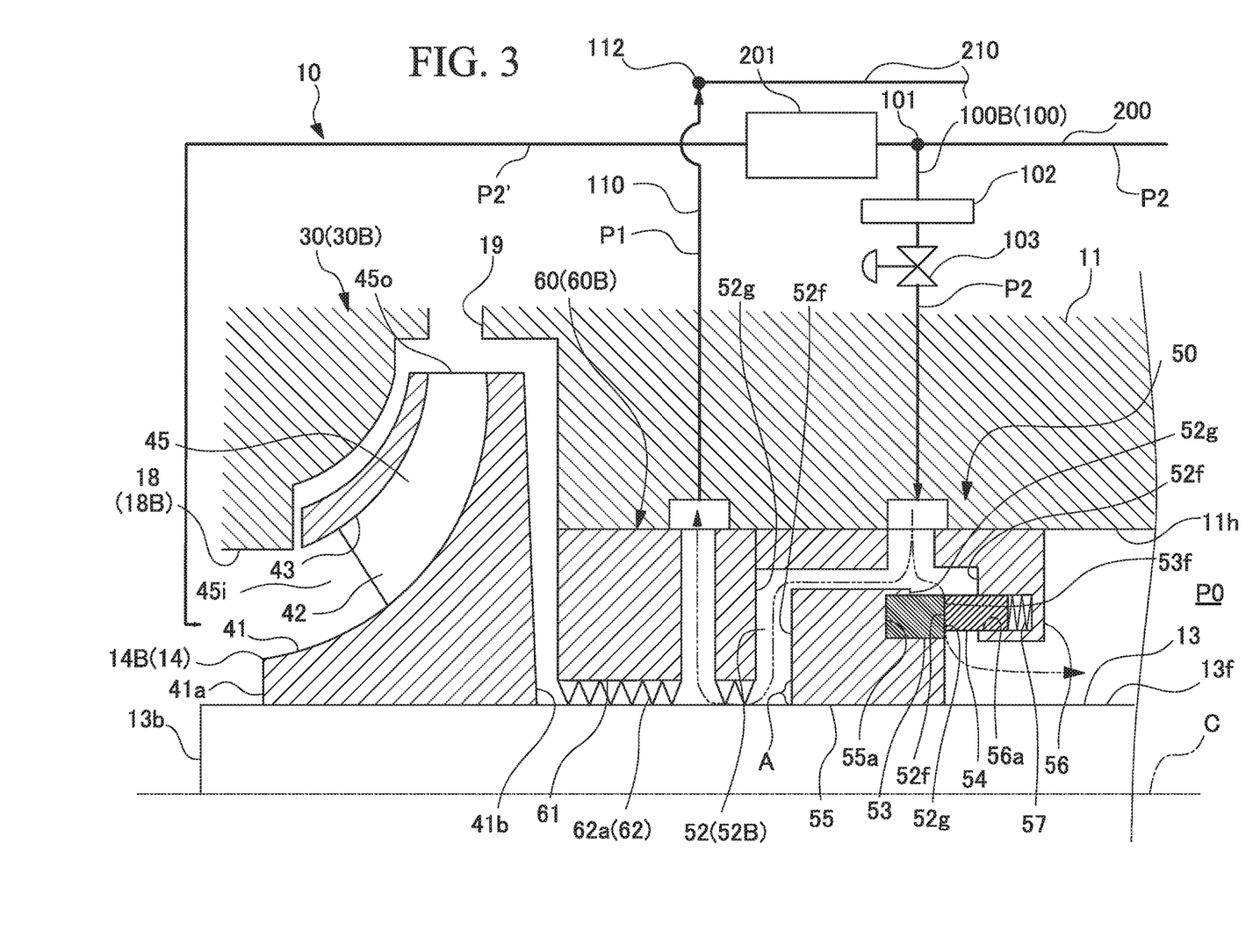
FIG. 3 is an enlarged sectional view of important parts of FIG. 2.

As shown in FIG. 3, the seal portion 51 includes a rotary ring 53, a stationary ring 54, a shaft sleeve 55, a retainer 56, and a coil spring 57.

The rotary ring 53 is provided integrally with the rotary shaft 13 on an outer circumferential portion of the rotary shaft 13. The tubular shaft sleeve 55 is fixed to the outer circumferential portion of the rotary shaft 13. A rotary ring holding recessed portion 55a holding the rotary ring 53 is formed in an end portion of the shaft sleeve 55 on an opposite side to the impeller 14 in the center axis C direction. The rotary ring 53 has an annular shape, and is fitted and held by the rotary ring holding recessed portion 55a. A helical groove (not shown) is formed in a surface 53f of the rotary ring 53, which faces the stationary ring 54.

The stationary ring 54 is held by the retainer 56 formed in the casing 11. The retainer 56 has an annular shape, and is provided in an inner circumferential surface of a shaft insertion hole 11h, through which the rotary shaft 13 penetrates inside and outside the casing 11 and is inserted. The retainer 56 is disposed on the opposite side to the impeller 14 with respect to the rotary ring 53. A stationary ring holding recessed portion 56a holding the stationary ring 54 is formed on a side of the retainer 56, which faces the rotary ring 53. The stationary ring 54 is slidably provided in the stationary ring holding recessed portion 56a in the center axis C direction of the rotary shaft 13. The coil spring 57 biasing the stationary ring 54 toward the rotary ring 53 is provided between the stationary ring 54 and the retainer 56 in the stationary ring holding recessed portion 56a.

The rotary ring 53 and the stationary ring 54 are provided to face each other in the center axis C direction of the rotary shaft 13. The stationary ring 54 is pressed against the rotary ring 53 by the coil spring 57.

When the rotation of the rotary shaft 13 is stopped, such a rotary ring 53 and such a stationary ring 54 are in close contact with each other under the biasing force of the coil spring 57. When the rotary shaft 13 rotates about the center axis C, the rotary ring 53 and the stationary ring 54 move in directions where the stationary ring 54 separates from the rotary ring 53 against the biasing force of the coil spring 57. Accordingly, a gap that allows a seal gas to flow is formed between the rotary ring 53 and the stationary ring 54.

The seal chamber 52 consists of an outer circumferential surface 13f of the rotary shaft 13 and the shaft sleeve 55, the rotary ring 53, the stationary ring 54, and the retainer 56, which configure the seal portion 51.

A seal gas is introduced into the first seal portion 50 through the gas supply path 100. The gas supply path 100 of the embodiment is formed in the casing 11 such that a seal gas such as nitrogen gas is introduced into the seal chamber 52 from the outside of the casing 11. The gas supply path 100 of the embodiment is connected to a working fluid flow path 200, in which a working fluid flows, by a supply side connecting portion 101. The working fluid, which is a seal gas, is introduced into the first seal portion 50 through the gas supply path 100. The gas supply path 100 is provided with a filter 102 that removes foreign substances from a gas and a flow rate valve 103 such as a flow regulation valve that performs the intermittent feeding of a seal gas and the regulation of a feed amount.

In a state where the rotary shaft 13 is rotating, the seal gas introduced through the gas supply path 100 flows into the seal chamber 52. The seal gas that has flowed in the seal chamber 52 passes through the gap between the rotary ring 53 and the stationary ring 54, and flows to the outside of the casing 11 from the shaft insertion hole 11*h* of the casing 11, which opens to the opposite side to the impeller 14. By the seal gas leaking from the inside to the outside of the casing 11 through the seal portion 51 in such a manner, the infiltration of foreign substances or the like from the outside to an impeller 14 side in the casing 11 is suppressed.

The second seal portion 60 is disposed between the impeller 14 and the first seal portion 50. The second seal portion 60 seals a portion between the rotary shaft 13 and the casing 11. That is, the second seal portion 60 suppresses the leakage of a working fluid from the impeller 14 side to a seal chamber 52 side and the infiltration of a seal gas from the seal chamber 52 side to the impeller 14 side. The second seal portion 60 of the embodiment is a labyrinth seal. The second seal portion 60 integrally includes a ring body 61 fixed to the casing 11 and a labyrinth portion 62, which is provided on the radially inner side of the ring body 61 and has a sliding contact surface 62*a*, which comes into sliding contact with the outer circumferential surface of the rotary shaft 13.

As shown in FIGS. 2 and 3, in the second-stage centrifugal compressing unit 30B, the gas supply path 100B is connected to the working fluid flow path 200 through which a working fluid is fed from the first-stage centrifugal compressing unit 30A to the second-stage centrifugal compressing unit 30B. The working fluid flow path 200 connects the discharge flow path 19A, which is provided on a discharge side of the first impeller 14A of the first-stage centrifugal compressing unit 30A, to the intake flow path 18B, which is provided on an intake side of the second impeller 14B of the second-stage centrifugal compressing unit 30B. The working fluid flow path 200 includes a cooling device 201 that cools the working fluid discharged from the discharge flow path 19A of the first-stage centrifugal compressing unit 30A.

As shown in FIG. 3, the gas supply path 100B of the second-stage centrifugal compressing unit 30B is connected to the working fluid flow path 200 by the supply side connecting portion 101 disposed on an upstream side (inlet side) of the cooling device 201. Accordingly, the gas supply path 100B communicates with the discharge side of the working fluid compressed by the first impeller 14A. The working fluid, which is a seal gas, is introduced into the seal chamber 52B by the gas supply path 100B being connected to the working fluid flow path 200, in which the working fluid flows. The gas supply path 100A of the first-stage centrifugal compressing unit 30A is connected to the discharge side of the second-stage centrifugal compressing unit 30B.

The gas outflow path 110 is provided in the second seal portion 60 of the second-stage centrifugal compressing unit 30B. The gas outflow path 110 communicates with a pressure space which has a pressure lower than that of a seal gas supplied from the gas supply path 100. The gas outflow path 110 allows at least some of the seal gas to flow out from the first seal portion 50 to the pressure space. The gas outflow path 110 of the embodiment is open to the sliding contact surface 62*a* of the second seal portion 60. The gas outflow path 110 is connected to a communication pipe 210 that communicates with the intake flow path 18A on the intake side of the first impeller 14A of the first-stage centrifugal compressing unit 30A by an outflow side connecting portion 112. The pressure of a working fluid in the outflow side connecting portion 112 is lower than in the supply side connecting portion 101 where the gas supply path 100B is connected to the working fluid flow path 200. Therefore, the gas outflow path 110 communicates with the pressure space in the communication pipe 210 having a pressure P1 before being compressed by the first impeller 14A.

When the pressure of the working fluid compressed by the first impeller 14A is set as a pressure P2, the working fluid flowing in the intake flow path 18A on the intake side of the first impeller 14A becomes the pressure P1 before being compressed by the first impeller 14A. In such a manner, the pressure of a flowing working fluid is lower in the outflow side connecting portion 112 connected to the gas outflow path 110 than in the supply side connecting portion 101 connected to the gas supply path 100B. Therefore, the gas outflow path 110 of the embodiment communicates with the pressure space in the communication pipe 210 having the pressure P1 before being compressed by the first impeller 14A.

When the gas outflow path 110 is included in the second-stage centrifugal compressing unit 30B as described above, at least some of a working fluid introduced in the seal chamber 52B from the gas supply path 100B passes a gap between the sliding contact surface 62*a* of the second seal portion 60B and the rotary shaft 13, and flows into the gas outflow path 110 that opens to the sliding contact surface 62*a*. The fluid that has flowed in the gas outflow path 110 flows out to the intake flow path 18A. Here, the working fluid flow path 200 to which a working fluid flows out from the gas outflow path 110 is a pressure space in which a working fluid is compressed via the first-stage centrifugal compressing unit 30A and has the pressure P2 higher than atmospheric pressure P0.

In this manner, a differential pressure ΔP (=P2−P1) between the pressure P2 of the gas supply path 100B and the pressure P1 of the gas outflow path 110 acts on an inner circumferential surface of the seal chamber 52B.

Here, the seal chamber 52B has a first pressure receiving surface 52*f* and a second pressure receiving surface 52*g*, which are orthogonal to the center axis C direction of the rotary shaft 13 and receive a thrust force in the center axis C direction, which is caused by the pressure of a working fluid (seal gas) in the seal chamber 52. Here, thrust forces cancel each other in the center axis C direction in a region where the first pressure receiving surface 52*f* positioned on the first impeller 14A side and the second pressure receiving surface 52*g* positioned on a second impeller 14B side face each other in the center axis C direction. That is, a thrust force that acts on the first pressure receiving surface 52*f* and faces the first impeller 14A side and a thrust force that acts on the second pressure receiving surface 52*g* and faces the second impeller 14B side cancel each other in the same areas of the first pressure receiving surface 52*f* and the second pressure receiving surface 52*g*. In other words, a thrust force corresponding to a difference between the areas of the first pressure receiving surface 52*f* and the second pressure receiving surface 52*g* (for example, a region shown with a reference sign A in FIG. 3) acts on the seal chamber 52B.

However, a working fluid introduced into the gas supply path 100B from the working fluid flow path 200 and a seal gas introduced into the gas supply path 100B from a seal gas supply source (not shown) may be appropriately switched in the second-stage centrifugal compressing unit 30B of the geared centrifugal compressor 10 described above. For example, at the start of the geared centrifugal compressor 10, a seal gas is introduced from the seal gas supply source (not shown) and sealing of the first seal portion 50 may be performed in a state where the pressure of a working fluid in the geared centrifugal compressor 10 has not risen. In this case, along with the seal gas, the working fluid may be introduced into the gas supply path 100B from the working fluid flow path 200. After the operation of the geared centrifugal compressor 10 starts and a sufficient amount (pressure) of working fluid is obtained, the introduction of the seal gas is stopped.

In the geared centrifugal compressor 10 of the embodiment described above, at least some of the working fluid introduced in the seal chamber 52B from the gas supply path 100B flows into the gas outflow path 110. Accordingly, some of the seal gas flows from the first seal portion 50 to the second seal portion 60. As a result, the pressure of the working fluid acting on the inner circumferential surface of the seal chamber 52B becomes low. Therefore, a thrust force in the center axis C direction of the rotary shaft 13 can be made weak. If the thrust force becomes weak, a load to be supported by the thrust bearings 17 decreases, and a sliding resistance when the impellers 14 rotate declines. In addition, it is unnecessary to make the thrust bearings 17 stronger. As a result, it is possible to suppress a decline in the operating efficiency of the geared centrifugal compressor 10 and a cost rise.

In addition, the working fluid of the geared centrifugal compressor 10, which is a seal gas, is supplied to the seal chamber 52B. Therefore, it is not necessary to supply a seal gas separately from the working fluid in order to make a thrust force weak, and thus cost reduction can be achieved.

In addition, the working fluid is introduced into the seal chamber 52B through the gas supply path 100B, and is smoothly discharged from the gas outflow path 110 due to a differential pressure between an outflow side connecting portion 111 and the supply side connecting portion 101.

In addition, the gas supply path 100B communicates with the discharge side of the working fluid compressed by the first impeller 14A. Therefore, the working fluid compressed by the first impeller 14A can be introduced into the seal chamber 52B through the gas supply path 100B. Accordingly, it is not necessary to increase the pressure of the working fluid introduced in the seal chamber 52B through the gas supply path 100B, and the effective use of energy can be achieved.

In addition, the gas outflow path 110 communicates with the intake side of the working fluid compressed by the first impeller 14A. In such a configuration, the working fluid discharged from the seal chamber 52B is introduced into the intake side of the first impeller 14A, and can be used again by the first impeller 14A increasing a pressure thereof again.

In addition, the gas outflow path 110 has a pressure lower than a pressure P3 of a working fluid on the discharge side of the second impeller 14B. Therefore, the inflow of a working fluid from a seal chamber 52B side to the second impeller 14B side beyond the second seal portion 60B is suppressed.

In addition, the seal chamber 52B has the first pressure receiving surface 52$f$ and the second pressure receiving surface 52$g$, which are orthogonal to the center axis C direction of the rotary shaft 13 and receive the pressure of a working fluid in the center axis C direction. By the first pressure receiving surface 52$f$ and the second pressure receiving surface 52$g$ receiving the pressure of the working fluid, a thrust force can be effectively reduced.

Modification Example of First Embodiment

Although the gas outflow path 110 is connected to the intake flow path 18A on the intake side of the first impeller 14A in the first embodiment, the invention is not limited thereto. The gas outflow path 110 may be appropriately connected to other parts insofar as a differential pressure sufficient to generate the flow of a working fluid from the seal chamber 52B to the gas outflow path 110 can be ensured between the gas supply path 100B and the gas outflow path 110.

Figure 4:
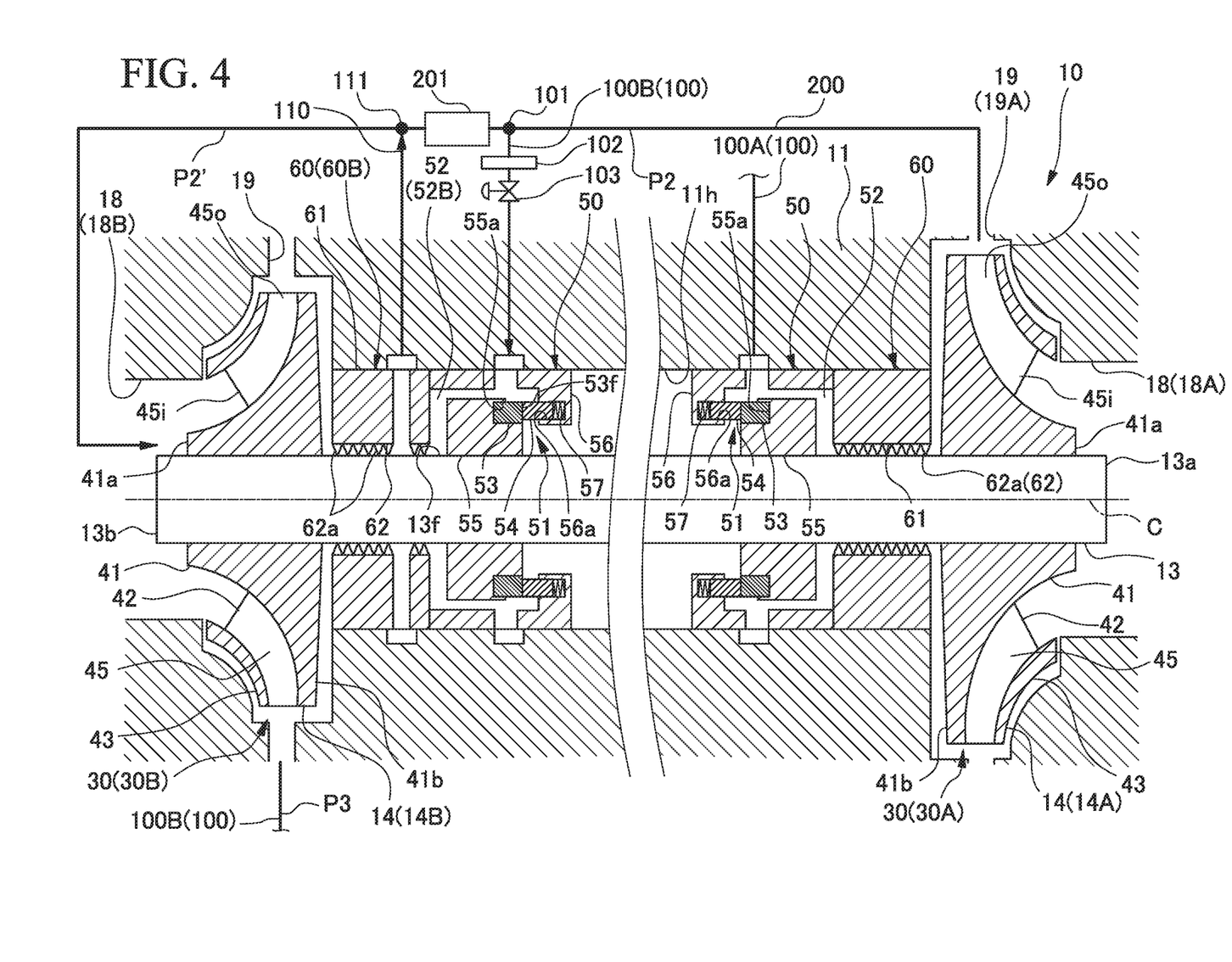
FIG. 4 is a sectional view showing a configuration of a modification example of the geared centrifugal compressor according to the first embodiment of the invention.

For example, as shown in FIG. 4, the gas outflow path 110 may be connected to the outflow side connecting portion 111 disposed on a downstream side (outlet side) of the cooling device 201 with respect to the working fluid flow path 200.

The pressure of the working fluid flowing in the working fluid flow path 200 declines due to a pressure loss in the cooling device 201 caused by flowing via the cooling device 201. When the pressure of the working fluid compressed by the first impeller 14A is set to the pressure P2, the pressure declines to P2' by flowing via the cooling device 201. In such a manner, the pressure of the working fluid is lower in the outflow side connecting portion 111 where the gas outflow path 110 is connected to the working fluid flow path 200 than in the supply side connecting portion 101 where the gas supply path 100B is connected to the working fluid flow path 200. Therefore, the gas outflow path 110 of the embodiment allows a space on the downstream side (outlet side) of the cooling device 201 in the working fluid flow path 200 to communicate with the pressure space.

In this manner, a differential pressure $\Delta P$ (=P2−P2') between the pressure P2 of the gas supply path 100B and the pressure P2' of the gas outflow path 110 acts on the inner circumferential surface of the seal chamber 52B. Accordingly, the working fluid can be smoothly moved from the gas supply path 100B to the gas outflow path 110 via the seal chamber 52B with the use of the differential pressure between the gas supply path 100B into which the working fluid compressed by the first impeller 14A is introduced and the gas outflow path 110 that communicates with the outlet side of the cooling device 201 of which a pressure has declined by flowing via the cooling device 201.

Second Embodiment

Next, a rotating machine of a second embodiment will be described with reference to FIGS. 5 and 6.

In the second embodiment, the same configuring elements as those of the first embodiment will be assigned the same reference signs and a detailed description thereof will be omitted. The geared centrifugal compressor 10 of the second embodiment has a configuration where the pressure of a working fluid to be supplied to the seal chamber 52 is automatically regulated according to a differential pressure between the gas supply path 100 and the gas outflow path 110.

Figure 5:
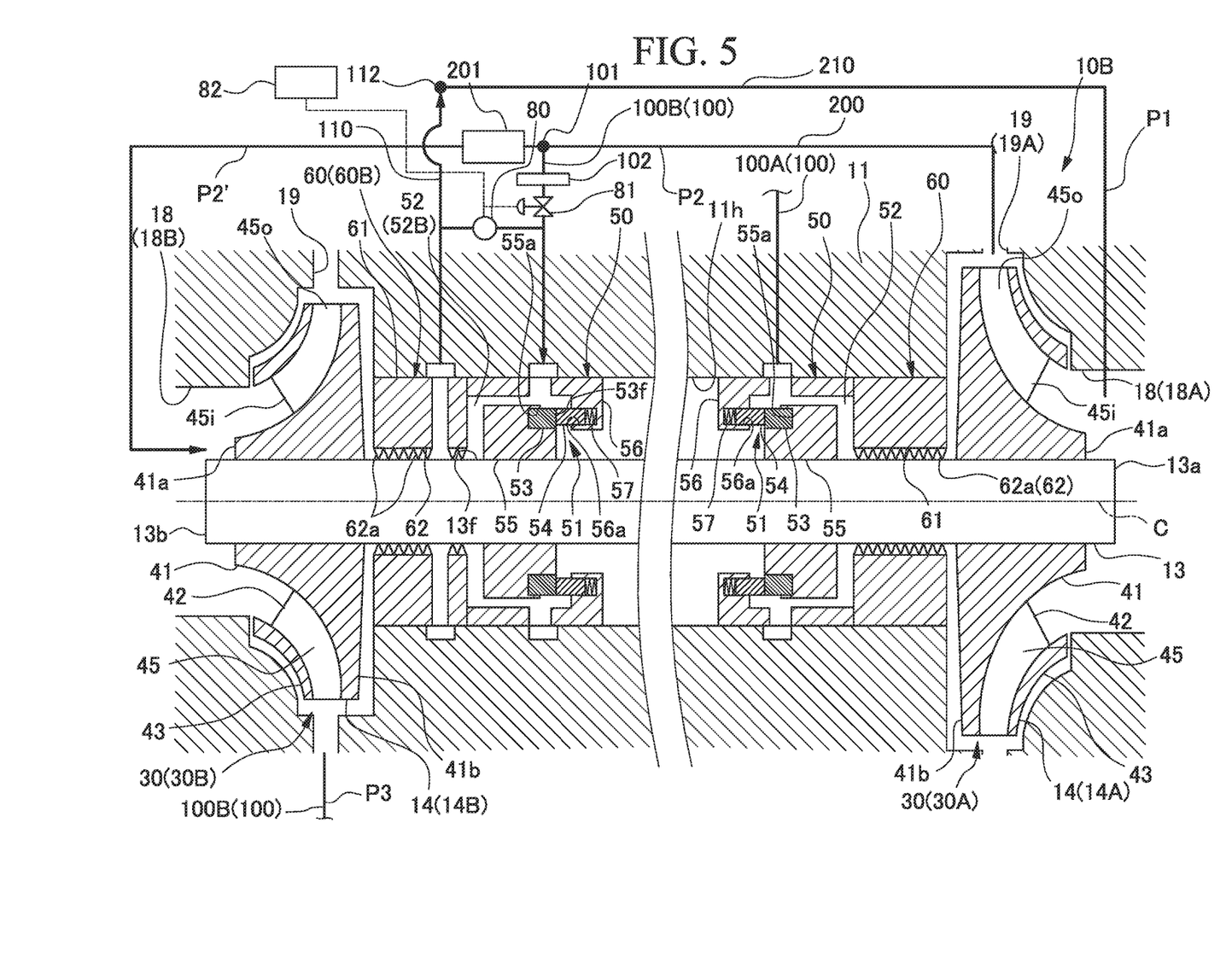
FIG. 5 is a sectional view showing a configuration of a geared centrifugal compressor according to a second embodiment of the invention.
Figure 6:
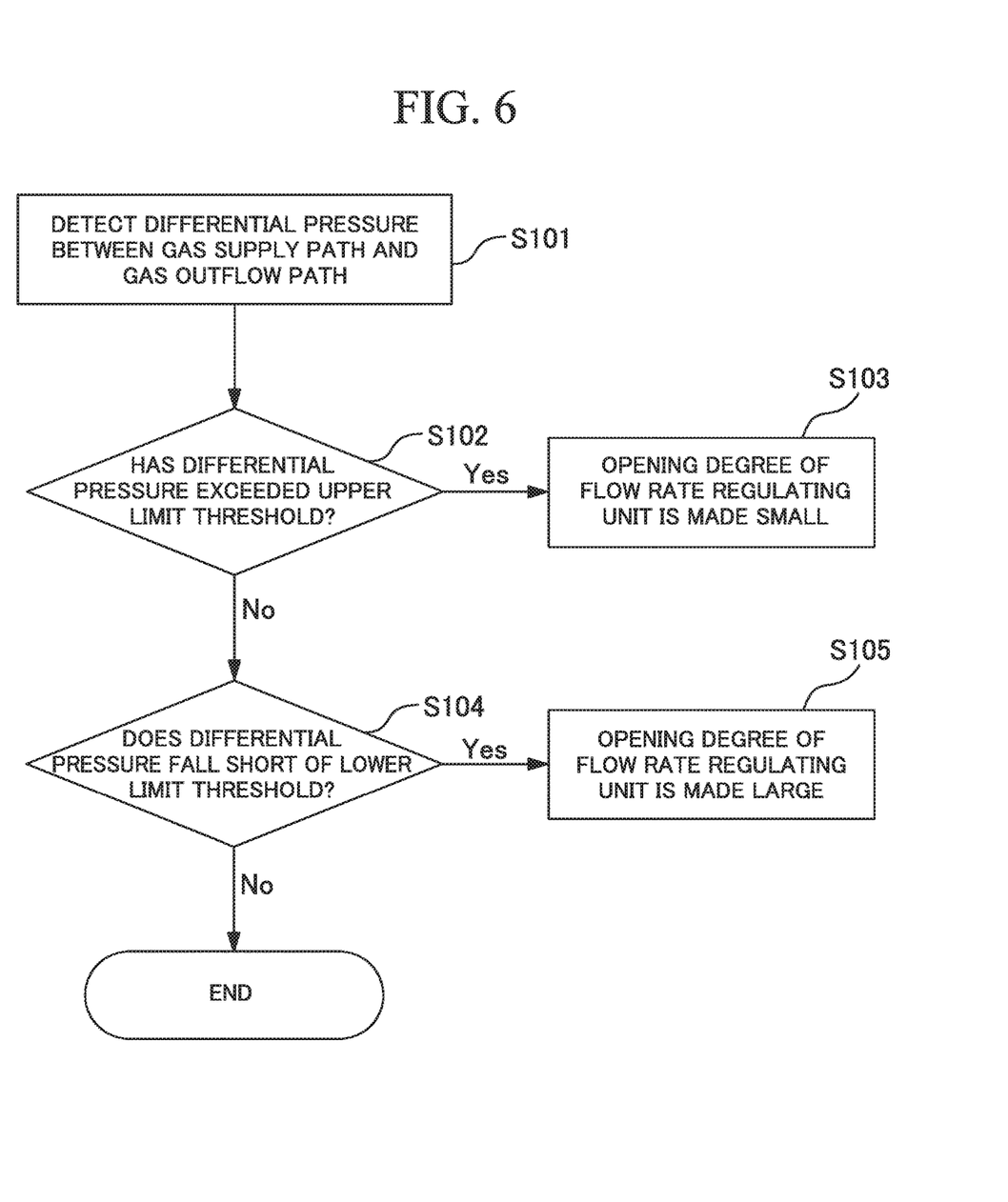
FIG. 6 is a flow chart showing flow of a process of controlling a pressure of a working fluid to be supplied to a seal chamber in the geared centrifugal compressor according to the second embodiment of the invention.

That is, as shown in FIG. 5, a geared centrifugal compressor 10B of the second embodiment includes the gas supply path 100B, the gas outflow path 110, a differential pressure detecting unit 80, a flow rate regulating unit 81, and a controller 82 in the second-stage centrifugal compressing unit 30B.

The differential pressure detecting unit 80 detects the differential pressure $\Delta P$ between the gas supply path 100B and the gas outflow path 110. The flow rate regulating unit 81 regulates the flow rate of a working fluid in the gas supply path 100B. The controller 82 regulates the opening degree of the flow rate regulating unit 81 according to the differential pressure $\Delta P$ detected by the differential pressure detecting unit 80.

A method of regulating the pressure of a working fluid to be supplied to the seal chamber 52 in the geared centrifugal compressor 10B will be described. For example, as shown in FIG. 6, the differential pressure detecting unit 80 detects the differential pressure ΔP between the gas supply path 100B and the gas outflow path 110 (Step S101).

The controller 82 determines whether or not the differential pressure ΔP detected by the differential pressure detecting unit 80 has exceeded a range of an upper limit threshold determined in advance (Step S102). In a case where the differential pressure ΔP has exceeded the upper limit threshold, the opening degree of the flow rate regulating unit 81 is made small (Step S103). Accordingly, the flow rate of a working fluid in the gas supply path 100B decreases, and the differential pressure ΔP between the gas outflow path 110 and the gas supply path 100B becomes low.

In addition, the controller 82 determines whether or not the differential pressure ΔP detected by the differential pressure detecting unit 80 falls short of a range of a lower limit threshold determined in advance (Step S104). In a case where the differential pressure ΔP falls short of the lower limit threshold, the opening degree of the flow rate regulating unit 81 is made large (Step S105). Accordingly, the flow rate of the working fluid in the gas supply path 100B increases, and the differential pressure ΔP between the gas outflow path 110 and the gas supply path 100B becomes high.

During the operation of the geared centrifugal compressor 10B, the processes of Steps S101 to S105 are repeated at a regular interval.

In the geared centrifugal compressor 10B of the embodiment described above, at least some of a working fluid introduced in the seal chamber 52B from the gas supply path 100B flows into the gas outflow path 110 as in the first embodiment. Accordingly, the pressure of a seal gas acting on the inner circumferential surface of the seal chamber 52B becomes low. Therefore, a thrust force in the center axis C direction of the rotary shaft 13 can be made weak. As a result, it is possible to suppress a decline in the operating efficiency of the geared centrifugal compressor 10 and a cost rise.

In addition, a thrust force can be appropriately regulated by regulating the flow rate of a working fluid in the gas supply path 100B according to a differential pressure between the gas supply path 100B and the gas outflow path 110.

Although embodiments of the present invention have been described above in detail with reference to the drawings, the configurations and combinations thereof in the embodiments are merely examples, and additions, omissions, substitutions, and other modifications of the configurations are possible without departing from the scope of the present invention. In addition, the present invention is not limited by the embodiments, and is limited only by claims.

For example, a so-called single-axis and two-stage configuration is described in the embodiments as an example of an aspect of the geared centrifugal compressor 10. However, the aspect of the geared centrifugal compressor 10 is not limited thereto, and a two-axis and four-stage configuration, or a two or more-axis and four or more-stage configuration may be adopted depending on design or specifications. In any configuration, the same operational effects as the embodiments can be obtained by each stage centrifugal compressing unit 30.

In addition, without being limited to the geared centrifugal compressor 10, the present invention can also be applied to a rotating machine such as a multi-stage centrifugal compressor, a multi-stage steam turbine, and a multi-stage gas turbine in which the rotary shaft 13 is directly rotationally driven by an external driving source.

INDUSTRIAL APPLICABILITY

The rotating machine described above can reduce a thrust force generated in the rotating machine.

REFERENCE SIGNS LIST

10, 10B: Geared centrifugal compressor (rotating machine)
11: Casing
11$h$: Shaft insertion hole
12: Radial bearing
13: Rotary shaft
13$a$: First end portion
13$b$: Second end portion
13$f$: Outer circumferential surface
14: Impeller
14A: First impeller
14B: Second impeller
15: Pinion gear
16: Bull gear
17: Thrust bearing
18, 18A, 18B: Intake flow path
19, 19A: Discharge flow path
20: Speed-up transmission unit
30, 30A, 30B: Centrifugal compressing unit
41: Disk portion
41$a$: First surface
41$b$: Second surface
42: Blade portion
43: Cover portion
45: Impeller flow path
45$i$: Inflow port
45$o$: Outflow port
50: First seal portion
51: Seal portion
52, 52B: Seal chamber
52$a$: Inner circumferential surface
52$f$: First pressure receiving surface
52$g$: Second pressure receiving surface
53: Rotary ring
53$f$: Surface
54: Stationary ring
55: Shaft sleeve
55$a$: Rotary ring holding recessed portion
56: Retainer
56$a$: Stationary ring holding recessed portion
57: Coil spring
60, 60B: Second seal portion
61: Ring body
62: Labyrinth portion
62$a$: Sliding contact surface
80: Differential pressure detecting unit
81: Flow rate regulating unit
82: Controller
100, 100B: Gas supply path
101: Supply side connecting portion
102: Filter
103: Flow rate valve
110: Gas outflow path
111: Outflow side connecting portion
112: Outflow side connecting portion
200: Working fluid flow path
201: Cooling device
210: Communication pipe
C: Center axis
ΔP, ΔPa, ΔPb: Differential pressure P0: Atmospheric pressure
P1, P2, P2', P3: Pressure
S101: Step
S102: Step
S103: Step
S104: Step
S105: Step

What is claimed is:

1. A rotating machine comprising:
   a rotary shaft that rotates about a center axis;
   a first impeller that is fixed to the rotary shaft and that compresses a working fluid by integrally rotating with the rotary shaft;
   a second impeller that is fixed to the rotary shaft and that compresses the working fluid compressed by the first impeller by integrally rotating with the rotary shaft;
   a casing that covers the rotary shaft;
   first seal portions that are disposed between the first impeller and the second impeller in a center axis direction of the rotary shaft and that each seal a portion between the rotary shaft and the casing with a seal gas;
   second seal portions that are disposed between the first impeller and the first seal portions and between the second impeller and the first seal portions and that each seal a portion between the rotary shaft and the casing;
   gas supply paths that each introduce the seal gas into each of the first seal portions; and
   a gas outflow path that is provided in one of the second seal portions that is disposed closest to the second impeller among the second seal portions and communicates with a pressure space having a pressure lower than that of the seal gas to allow at least some of the seal gas to flow out from one of the first seal portions that is disposed closest to the second impeller among the first seal portions to the pressure space,
   wherein the second impeller faces away from the first impeller in the center axis direction,
   wherein each of the gas supply paths is connected to a working fluid flow path at a supply side connecting portion,
   wherein the working fluid flows in the working fluid flow path,
   wherein the gas outflow path is connected to the working fluid flow path at a position where a pressure of the working fluid is lower than that of the supply side connecting portion,
   wherein one of the gas supply paths that is disposed closest to the second impeller among the gas supply paths communicates with the working fluid flow path at a position where the working fluid compressed by the first impeller flows, and
   wherein one of the gas supply paths that is disposed closest to the first impeller among the gas supply paths communicates with the working fluid flow path at a position where the working fluid compressed by the second impeller flows.

2. The rotating machine according to claim 1,
   wherein the gas outflow path communicates with the working fluid flow path at a position where the working fluid to be flowed into the first impeller flows.

3. The rotating machine according to claim 1, further comprising:
   a cooling device that cools the working fluid discharged from the first impeller,
   wherein the gas outflow path communicates with the working fluid flow path at a position where the working fluid cooled by the cooling device flows.

4. The rotating machine according to claim 1, further comprising:
   a differential pressure detecting unit that detects a differential pressure between the one of the gas supply paths that is disposed closest to the second impeller among the gas supply paths and the gas outflow path; and
   a flow rate regulating unit that regulates a flow rate of the working fluid in the one of the gas supply paths that is disposed closest to the second impeller among the gas supply paths in accordance with the differential pressure detected by the differential pressure detecting unit.

* * * * *